May 1, 1928. 1,668,214
K. W. LIEBAU
MACHINE FOR DETREADING TIRE CARCASSES
Filed Oct. 27, 1925
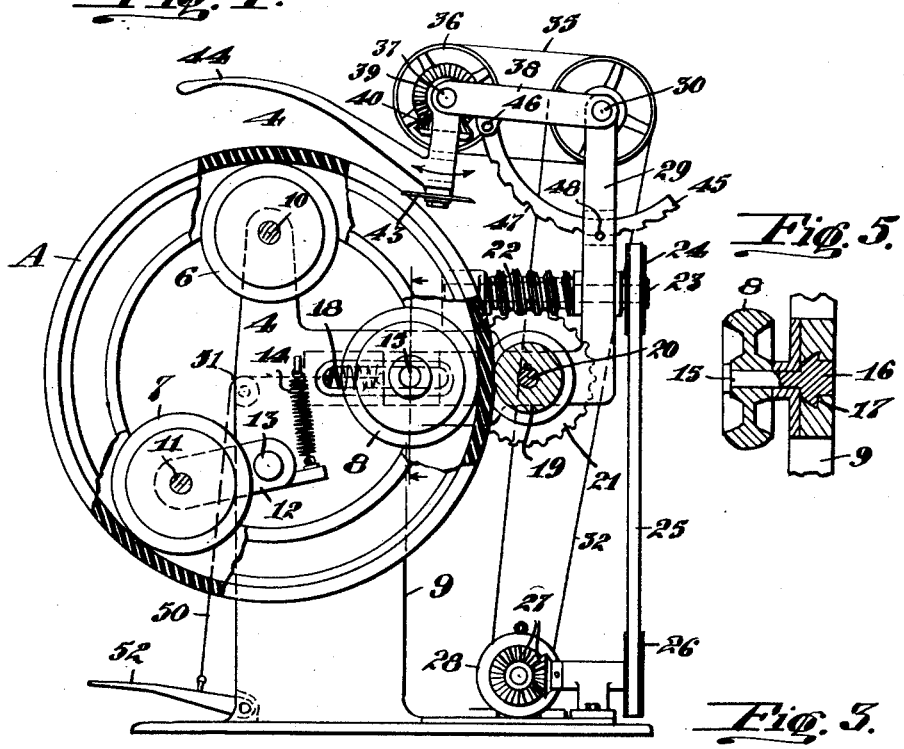
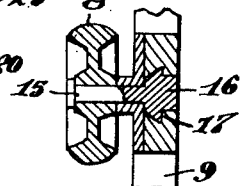
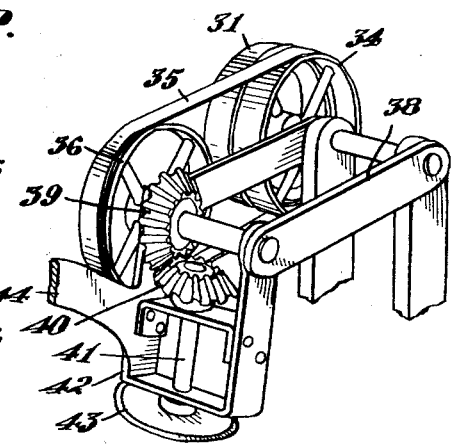
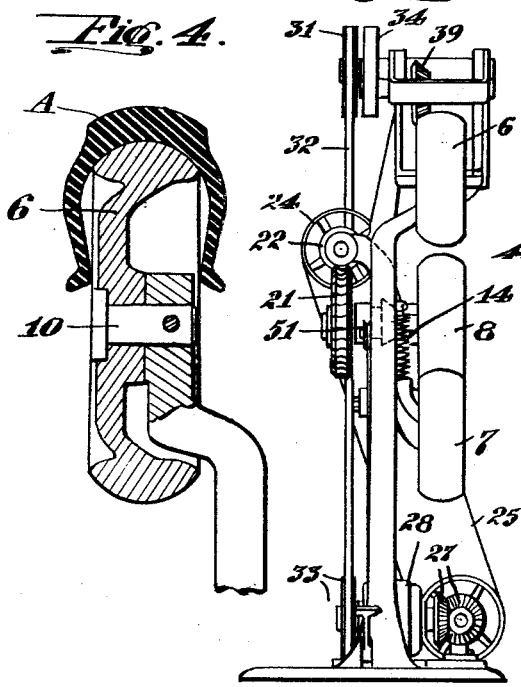
Inventor
Karl W. Liebau Patented May 1, 1928.

1,668,214

UNITED STATES PATENT OFFICE.

KARL W. LIEBAU, OF LOS ANGELES, CALIFORNIA.

MACHINE FOR DETREADING TIRE CARCASSES.

Application filed October 27, 1925. Serial No. 65,182.

In the specification and accompanying drawing I shall describe and show a preferred form of my invention, and specifically mention certain of its more important objects. I do not limit myself to the form disclosed, since various changes and adaptations may be made therein without departing from the essence of invention as hereinafter disclosed and claimed.

This invention particularly pertains to a machine for removing the tread portions of the carcasses of pneumatic tires preparatory to re-treading same and has as its primary object the provision of a simple and effective means whereby a tire carcass may be rotated and presented to a manually controlled power-operated severing device, whereby the tread portions of the tire carcass may be easily, quickly and accurately removed.

Another object is to provide a machine of the above character which is adapted to be adjusted to operate on tires of various sizes.

Another object is to provide an efficient mechanism whereby the tire may be rotated at a relatively slow speed and a rotary cutter revolved at relatively high speed.

A further object is to provide a means whereby the tire carcass may be rotated by a frictional drive imparted directly to the tire.

The invention resides generally in the provision of a series of spaced rollers adapted to engage the inner perimeter of the tire carcass and around which the tire carcass is revoluble under the urge of a frictional roller engaging the outer periphery or tread portion of the tire opposite one of said rollers, and further resides in the provision of a manually controlled power driven rotary cutter positioned tangentially to the tread portion of the tire and adapted to be moved in and out of engagement therewith to effect severance of the tread portion when the tire revolves, and also resides in the provision of a support for said cutter adapted to be adjusted to accommodate the machine for operating on tires of various diameters.

With the foregoing objects in view, together with such other objects and advantages as may subsequently appear, the invention resides further in the parts and in the construction, combination and arrangement of parts hereinafter described and claimed and illustrated by way of example in the accompanying drawings, in which:—

Fig. 1 is a view in front elevation of the machine, with parts broken away, showing it as applied;

Fig. 2 is a view in end elevation as seen in the direction indicated by the arrow 2 in Fig. 1, with the tire carcass removed;

Fig. 3 is a perspective view as seen generally in the direction of the arrow 3 in Fig. 1, illustrating the cutter driving and adjusting mechanism;

Fig. 4 is a detail in vertical section as seen on the line 4—4 of Fig. 1;

Fig. 5 is a detail in vertical section as seen on the line 5—5 of Fig. 1.

Referring to the drawings more specifically, 6, 7 and 8 indicate a series of three idle rollers which are suitably spaced apart and are adapted to be interposed within a tire carcass A in engagement with the inner perimeter to afford a support therefor; the rollers being supported generally on suitable standards 9. The upper roller 6 is mounted on a shaft 10, suitably supported in the standard on which roller the depending load of the tire carcass is carried. The roller 7 is journalled on a shaft 11, carried by a rocker arm 12, pivoted at 13 and with which rocker connects a spring 14 operable to cause the roller 7 to bear downwardly on the tire carcass under yieldable pressure. The roller 8 is journalled on a spindle 15 carried by a slide block 16, supported in a horizontal guideway 17, provided on the standard 9; the slide block being under the urge of a spring 18 whereby the roller 8 is caused to bear laterally on the inner periphery of the tire carcass under yieldable pressure. A friction drive roller 19 journalled in suitable bearings on the standard 9 is arranged to bear on the tread portion of the tire carcass diametrically opposite the roller 8; the drive roller 19 being here shown as mounted on a shaft 20 fitted with a worm gear 21 meshing with a worm 22 on the shaft 23, fitted with a pulley 24, engaged by a belt 25 passing around a pulley 26 adapted to be driven through gears 27 from a motor 28 or any other suitable source of power.

Formed on the standard 9 is an upward extension 29, on which is supported a shaft 30 carrying a pulley 31, engaged by a belt 32 passing around a pulley 33 mounted on the drive shaft of the motor 28. Fixed on the shaft 30 is a second pulley 34 around which passes a belt 35 leading around a pulley 36 on a shaft 37, supported on a pair of rocker arms 38 pivoted axially of the shaft 30 to rock vertically. The shaft 37 is fitted with a beveled gear 39, meshing with a beveled pinion 40 on a downwardly extending shaft 41 suitably journalled in a depending oscillatory bracket 42 pivoted to swing horizontally around the axis of the shaft 37. The lower end of the shaft 41 is fitted with a rotary cutter 43, which is adapted to be engaged with the tread portion of the tire A and to extend tangentially thereto. The hanger 42 is fitted with a handle 44 whereby it may be manipulated to dispose the rotary cutter in proper relation to the tread portion of the tire and effect severance thereof to a proper depth. Means are provided for supporting the arms 38 in various adjusted vertical positions which embodies a segmental arm 45 pivoted at 46 to one of the arms 38 and extending downwardly alongside the extension 29 on the standard where notches 47 on the under side of the segment are engaged by a pin or set screw 48; this device serving as a means for adjusting the vertical plane of the cutter 43.

As a means for facilitating mounting a tire on the rollers 6, 7 and 8, means are provided for retracting the slide block 16 in opposition to the spring 18, here shown as embodying a cable 50, which connects with the slide block 16 and passes around a direction roller 51 and leads to a foot lever 52 on the depression of which the slide block and the roller 8 are retracted relative to the friction roller 19, so that the tire may be placed between the rollers 18 and 19 and removed therefrom.

The operation of the invention is apparent from the foregoing; it being seen that on positioning the tire carcass on the rollers 6, 7 and 8 it may be rotated through the medium of the friction roller 19 on rotation of the latter and that the operator, by manipulating the lever 44, may move the cutter 43 tangentially into engagement with the advancing tread portion of the tire carcass so as to effect severance thereof; the cutter 43 being rotated at relatively high speed coincident with the revolving of the tire carcass at relatively slow speed.

The rollers 6, 7 and 8 are formed of such width that when positioned within the tire carcass they will operate to effect a spread of the side walls of the carcass and effect contact with the inner margins of the side walls of the tire carcass whereby the movement of the latter around the several rollers will be effectively guided.

I claim:—

1. In a machine for removing the tread portions from tire carcasses, means for supporting a tire carcass, means for effecting rotation of the tire carcass on its support, a power-propelled rotary cutter arranged to be presented tangentially to the tread portion of the tire carcass and operable to effect removal of the tread portion of the tire carcass circumferentially thereof on rotation of said tire carcass, and a support for said cutter adapted to be oscillated to advance or retract the cutter relatively to the tire carcass, said cutter being rotatable in a plane tangential to the tread of the tire.

2. In a machine for removing the tread portions from tire carcasses, means for supporting a tire carcass, means for effecting rotation of the tire carcass on its support, a power propelled rotary cutter arranged to be presented tangentially to the tread portion of the tire carcass and also to be rotated in a plane tangential to said tread portion, a support for said cutter adapted to be oscillated to advance or retract the cutter relatively to the tire carcass, and means for adjusting the cutter vertically with relation to the tire carcass.

3. In a machine for severing the tread portion of tire carcasses, a plurality of spaced idling rollers adapted to engage the inner periphery of the tire carcass, means whereby at least two of said rollers will bear against said tire carcass under tension, power driven frictional means engaging with said tire carcass operable to effect rotation thereof, a rotary cutter, means for impelling the same, and means whereby said cutter may be manually advanced or retracted tangentially of the tread portion of the tire carcass, said cutter also being rotatable in a plane tangential to the tread portion.

4. In a machine for de-treading tire carcasses, a series of rollers adapted to be interposed within the tire carcass and to afford a support therefor, a spring-pressed slide block carrying one of said rollers whereby the latter is caused to press against the tire carcass from the inner side thereof, a friction roller bearing against the outer periphery of the tire carcass opposite the last named roller, power-propelled means for driving said friction roller, and a power driven cutter adapted to be manually advanced and retracted tangentially relatively to the tread portion of the tire carcass, said cutter also being rotatable in a plane tangential to said tread portion.

5. In a machine for de-treading tire carcasses, a series of rollers adapted to be interposed within the tire carcass and to afford a support therefor, a spring-pressed slide block carrying one of said rollers whereby the latter is caused to press against the tire from the inner side thereof, a friction roller bearing against the outer periphery of the tire carcass opposite the last named roller, power propelled means for driving said friction roller, a power driven cutter adapted to be manually advanced and retracted tangentially relatively to the tread portion of the tire carcass, and means whereby said slide block may be manually retracted and held in spaced relation to said friction roller, said cutter also being rotatable in a plane tangential to said tread portion.

6. In a machine for detreading tire carcasses, a series of rollers adapted to be interposed within the tire carcass and to afford a support therefor, a spring pressed slide-block carrying one of said rollers whereby the latter is caused to press against the inner side of the tire carcass, and means operable by a workman to independently retract said roller from engagement with the tire.

7. In a machine for detreading tire carcasses, a series of rollers adapted to be interposed within the tire carcass and to afford a support therefor, spring-pressed means normally tending to hold one of said rollers into engagement with the interior of said tire, a flexible connection secured to said means, and a lever to which said connection is fastened to enable a workman to retract said roller independently of the other rollers.

KARL W. LIEBAU.